US012347976B2

(12) United States Patent
Chen et al.

(10) Patent No.: US 12,347,976 B2
(45) Date of Patent: Jul. 1, 2025

(54) CABLE SHIELDING WITH CONDUCTIVE RESIN

(71) Applicant: Google LLC, Mountain View, CA (US)

(72) Inventors: Andrew Chen, Shenzhen (CN); Billy Liu, Shanghai (CN); Hj Fong, Taipei (TW); Jay Lee, Taipei (TW)

(73) Assignee: Google LLC, Mountain View, CA (US)

( * ) Notice: Subject to any disclaimer, the term of this patent is extended or adjusted under 35 U.S.C. 154(b) by 373 days.

(21) Appl. No.: 18/010,785

(22) PCT Filed: Jun. 26, 2020

(86) PCT No.: PCT/CN2020/098324
§ 371 (c)(1),
(2) Date: Dec. 15, 2022

(87) PCT Pub. No.: WO2021/258393
PCT Pub. Date: Dec. 30, 2021

(65) Prior Publication Data
US 2023/0246390 A1 Aug. 3, 2023

(51) Int. Cl.
*H01R 13/6581* (2011.01)
*H01R 13/6591* (2011.01)
(Continued)

(52) U.S. Cl.
CPC ... *H01R 13/6581* (2013.01); *H01R 13/65914* (2020.08); *H01R 43/24* (2013.01); *H01R 13/6599* (2013.01)

(58) Field of Classification Search
CPC .......... H01R 13/6581; H01R 13/65914; H01R 43/24; H01R 13/6599; H01R 13/6593;
(Continued)

(56) References Cited

U.S. PATENT DOCUMENTS

| 10,574,004 | B2* | 2/2020 | Akita | H01R 13/7137 |
| 2007/0082536 | A1* | 4/2007 | Kuo | H01R 13/6215 |
| | | | | 439/364 |

(Continued)

FOREIGN PATENT DOCUMENTS

| CN | 201663258 U | 12/2010 |
| CN | 205385151 U | 7/2016 |

(Continued)

OTHER PUBLICATIONS

International Search Report for PCT/CN2020/098324 mailed Mar. 18, 2021, 8 pages.

*Primary Examiner* — Truc T Nguyen
(74) *Attorney, Agent, or Firm* — Kilpatrick Townsend & Stockton LLP

(57) ABSTRACT

A cable assembly includes a connector head electrically coupled to a plurality of conductors disposed in a cable, the connector head having a plug and a conductor interface; an outer shell including a first portion encasing the plug of the connector head, and a second portion encasing the conductor interface of the connector end; an inner shell including a connector end encasing the second portion of the outer shell, and a cable end encasing a portion of the cable and including an injection gate; and conductive resin including a first portion disposed inside the connector end of the inner shell, and a second portion disposed inside and outside the cable end of the inner shell; wherein inside and outside portions of the second portion of the conductive resin are connected through the injection gate.

15 Claims, 5 Drawing Sheets

(51) Int. Cl.
*H01R 43/24* (2006.01)
*H01R 13/6599* (2011.01)

(58) Field of Classification Search
CPC .. H01R 13/6658; H01R 13/504; H01R 31/06; B29C 2045/14557; B29C 45/0001; B29C 45/14426; B29K 2995/0005
See application file for complete search history.

(56) References Cited

U.S. PATENT DOCUMENTS

| | | | |
|---|---|---|---|
| 2007/0178745 A1* | 8/2007 | Kuo ................ | H01R 13/719 |
| | | | 439/405 |
| 2019/0199012 A1* | 6/2019 | Hirata ............... | H01R 24/40 |
| 2022/0069518 A1* | 3/2022 | Kugler ............. | H01R 24/545 |
| 2024/0088600 A1* | 3/2024 | Higashitani ....... | H01R 13/512 |

FOREIGN PATENT DOCUMENTS

| | | |
|---|---|---|
| CN | 210806186 U | 6/2020 |
| WO | 2021/258393 A | 12/2021 |

\* cited by examiner

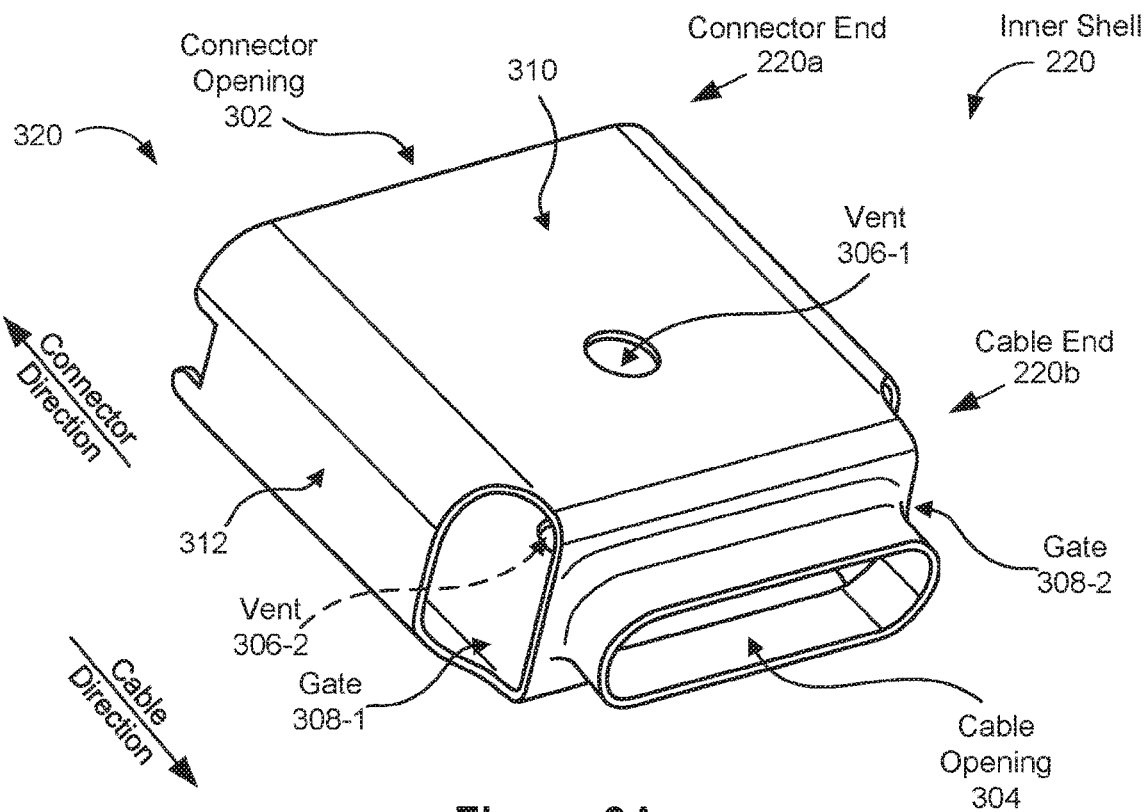
Figure 3A
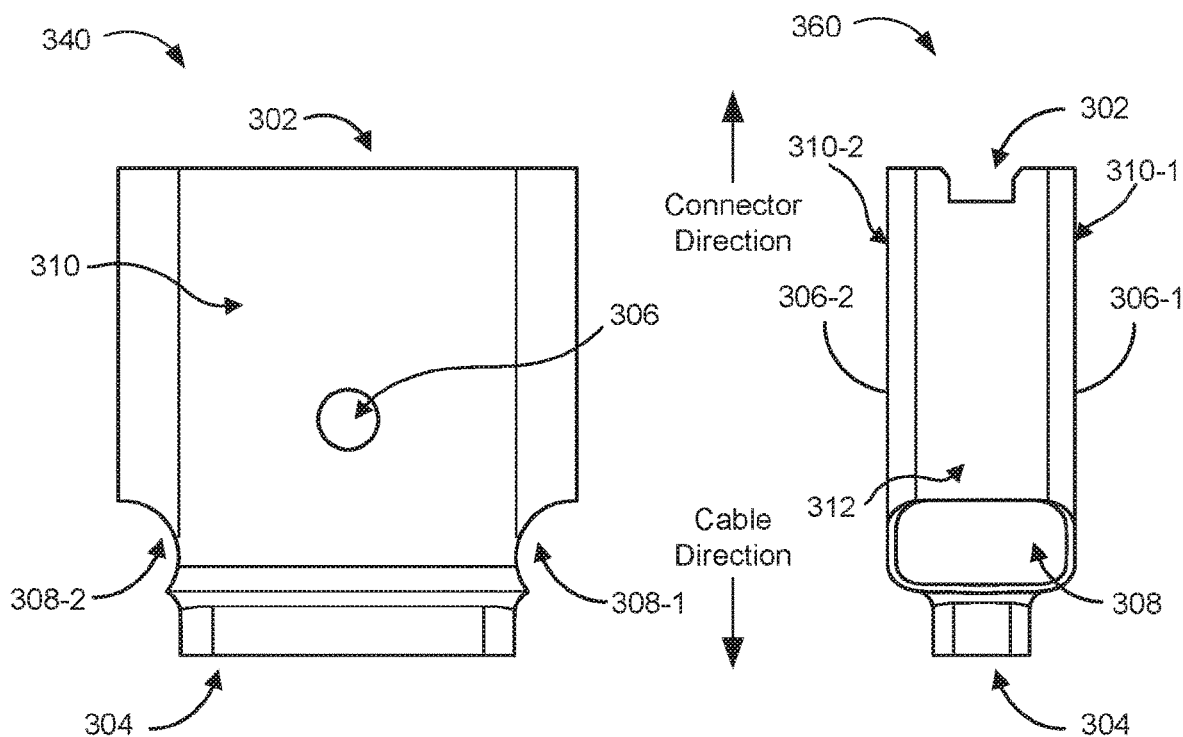
Figure 3B
Figure 3C

CABLE SHIELDING WITH CONDUCTIVE RESIN

CROSS-REFERENCE TO RELATED APPLICATIONS

This application is a 371 National Stage filing of PCT Application No. PCT/CN2020/098324, filed Jun. 26, 2020, the full disclosure of which is hereby incorporated by reference.

TECHNICAL FIELD

This relates to a cable assembly with conductive resin disposed throughout an inner shell, the cable assembly having improved structural integrity and electromagnetic shielding.

BACKGROUND

A cable assembly includes cable components and connector components. Cable components may include one or more electrical conductors (e.g., wires), and connector components may include a plug having electrical contacts configured for physical coupling with corresponding electrical contacts in devices configured to connect with the plug. In some instances, the interface between the cable and connector components may be a source of structural weakness and/or noise (e.g., electromagnetic interference (EMI) and/or radio frequency interference (RFI). Such noise may cause degradation in sensitivity (desense) of wireless communication components in proximity to the connector components.

SUMMARY

This disclosure describes a cable assembly and a method of manufacturing the same. A connector of the cable assembly provides improved structural support at the interface between cable and connector components. The connector also provides improved shielding, thereby reducing the amount of desense-causing noise that may negatively affect wireless communication components in proximity to the connector. Further, such a connector may be manufactured with a reduced number of steps when compared to traditional manufacturing methods, thereby simplifying the manufacturing process and reducing manufacturing costs.

In one aspect, a cable assembly includes a connector head electrically coupled to a plurality of conductors disposed in a cable, the connector head having a plug and a conductor interface. An outer shell of the cable assembly includes a first portion encasing the plug and a second portion encasing the conductor interface. An inner shell of the cable assembly includes a connector end encasing the second portion of the outer shell and a cable end encasing a portion of the cable and including an injection gate. The cable assembly includes conductive resin having a first portion disposed inside the connector end of the inner shell and a second portion disposed inside and outside the cable end of the inner shell. Inside and outside portions of the second portion of the conductive resin are connected through the injection gate, and the connector end of the inner shell and the second portion of the conductive resin form a contiguous surface.

In another aspect, a method of manufacturing a cable assembly includes: coupling a plurality of conductors disposed in a cable to a conductor interface of a connector head; encasing a plug of the connector head in an outer shell, the outer shell including a first portion encasing the plug and a second portion encasing the conductor interface; and encasing the second portion of the outer shell within an inner shell, the inner shell including a connector end encasing the second portion of the outer shell, a cable end encasing a portion of the cable, an injection gate, and an injection monitoring region disposed between the connector end of the inner shell and the cable end of the inner shell. The method further includes injecting conductive resin into the injection gate of the cable end of the inner shell and ceasing injection of the conductive resin when a first portion of the conductive resin is disposed in the injection monitoring region and a second portion of the conductive resin is disposed inside and outside the cable end of the inner shell.

BRIEF DESCRIPTION OF THE DRAWINGS

The following figures depict various views of implementations described in the Detailed Description below. Features shared between figures are similarly numbered.

FIGS. 3A-3C depict an example inner shell of the cable assembly of FIG. 1 in accordance with some implementations.

DETAILED DESCRIPTION

Figure 1:
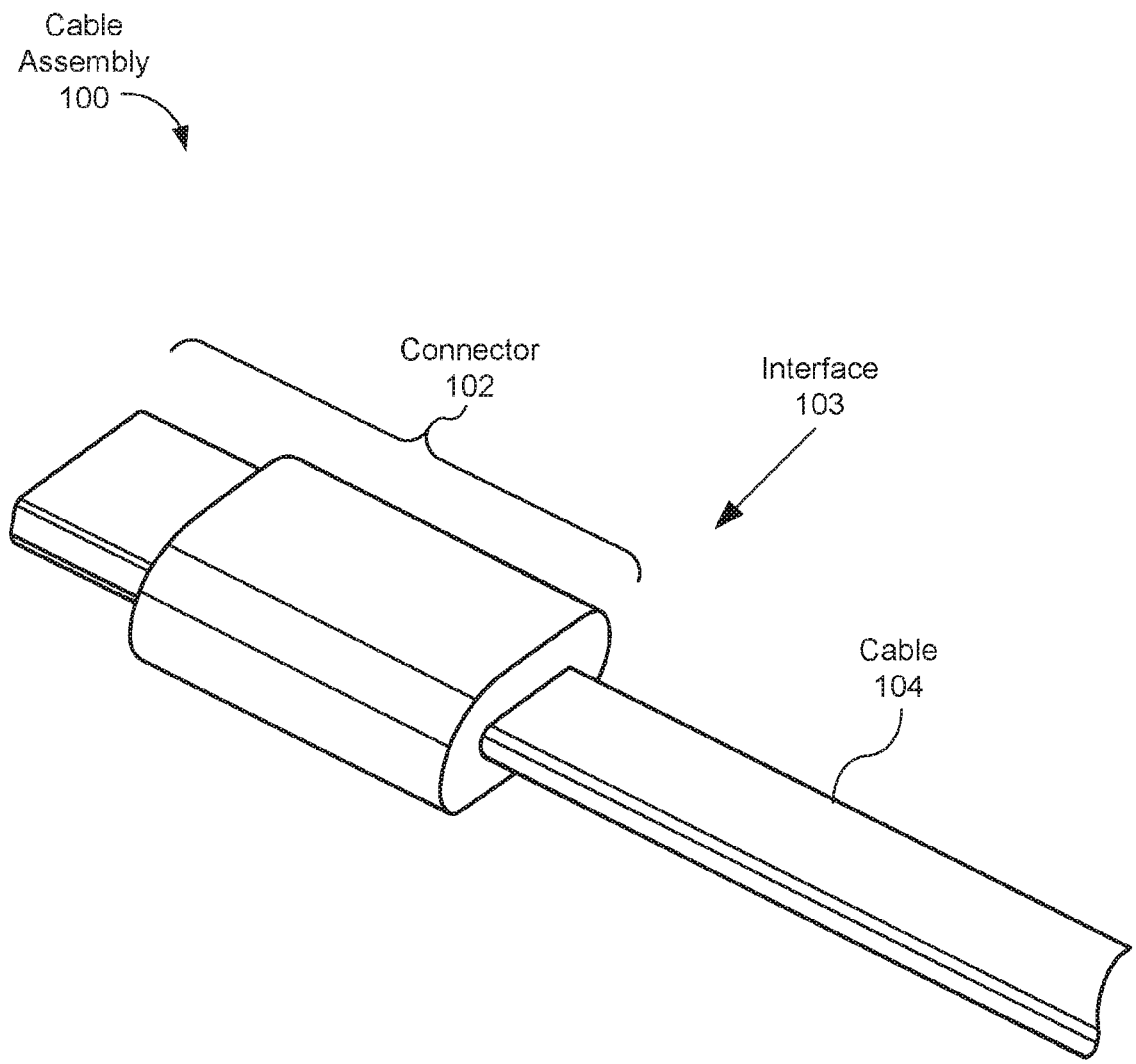
FIG. 1 depicts an example cable assembly in accordance with some implementations.

FIG. 1 depicts an example cable assembly 100 in accordance with some implementations. The cable assembly 100 includes a connector 102 and a cable 104. The connector 102 may be a plug (also referred to as a male plug or a male connector) or a socket (also referred to as a female plug or a female connector). The cable 104 includes one or more electrical conductors (e.g., wires, not shown in FIG. 1), and the connector 102 includes one or more electrical contacts (not shown in FIG. 1) configured for physical coupling (e.g., via a receptacle) with corresponding electrical contacts in a device (not shown in FIG. 1) configured to connect with the connector 102. The connector 102 and the cable 104 join at an interface 103. The interface 103 may include portions of both the connector 102 and the cable 104. The interface 103 includes components (described in more detail with reference to FIGS. 2-5E below) that enhance structural integrity and optimize electromagnetic shielding of the cable assembly 100.

Figure 2:
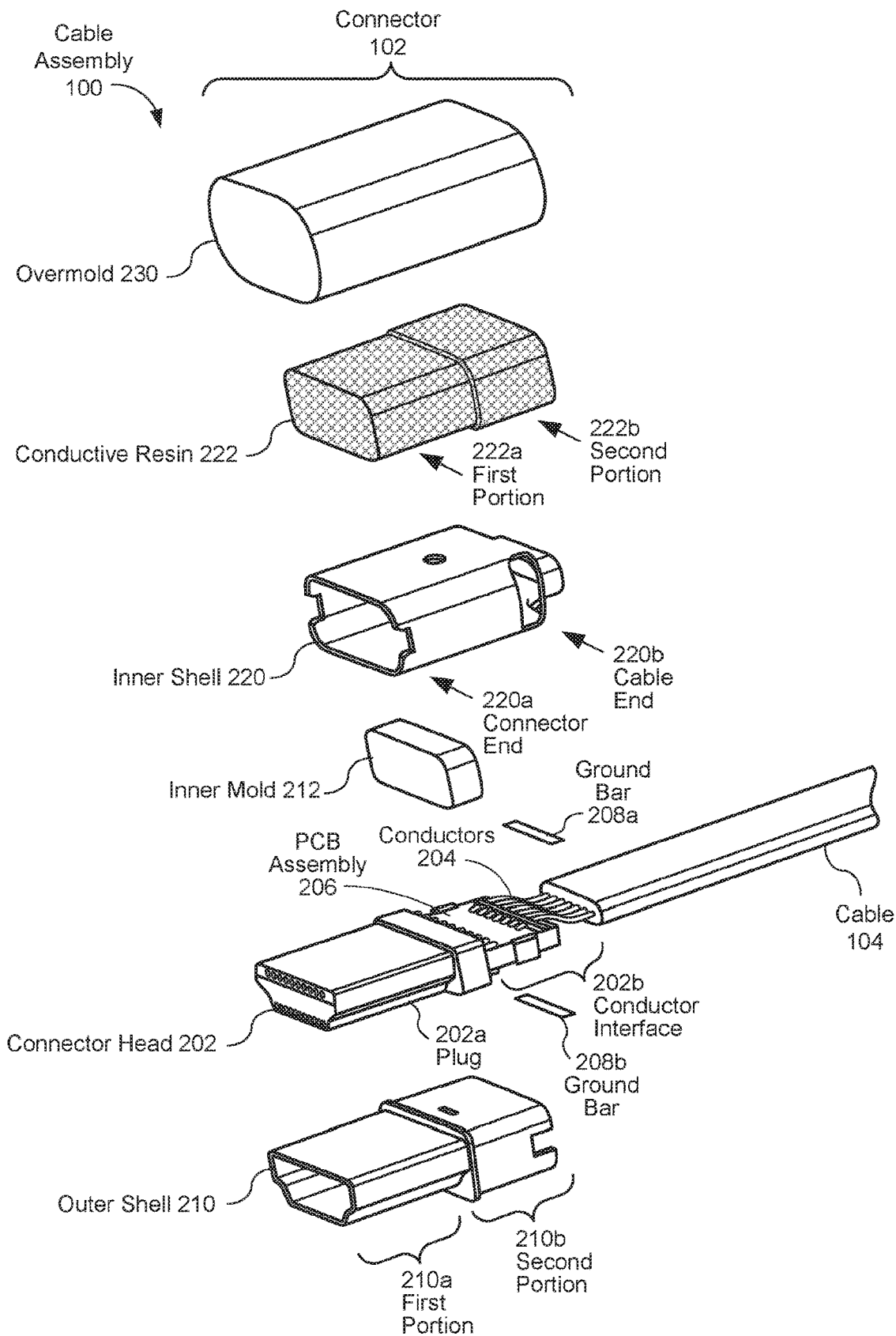
FIG. 2 depicts an exploded view of the cable assembly of FIG. 1 in accordance with some implementations.

FIG. 2 depicts an exploded view of the cable assembly 100 including a connector 102 and a cable 104 in accordance with some implementations. The cable assembly 100 includes a connector head 202 electrically coupled to a plurality of conductors 204 disposed in a cable 104, the connector head having a plug 202a (e.g., a high definition multimedia interface (HDMI) connector) and a conductor interface 202b. The conductor interface 202b electromechanically couples the conductors 204 to corresponding positions (e.g., metal contacts) in the plug 202a. The conductor interface 202b optionally includes a printed circuit board (PCB) assembly 206, on which the conductors 204 are electromechanically coupled (e.g., soldered to metal contacts on the PCB). Alternatively, the conductors 204 may be electromechanically coupled to corresponding positions (e.g., metal contacts) in the plug 202a without the presence of a PCB assembly 206. The PCB assembly 206 may include electrical termination and/or structural components for terminating and stabilizing the conductors 204. For example, one or more ground bars 208a, 208b (e.g., strips of metal and/or solder comprising, for example, phosphorous-copper alloy) may be electrically coupled to shielding of the conductors 204 and the inner shell 220 (described in more detail below), thereby providing grounding for shielding of the cable assembly 100. In some implementations, the connector head 202 comprises plastic (e.g., liquid crystal polymer) or any other material with insulating properties.

The cable assembly 100 includes an outer shell 210 disposed about the connector head 202. The outer shell 210 includes a first portion 210a encasing the plug 202a of the connector head, and a second portion 210b encasing the conductor interface 202b of the connector head. In some implementations, an inner mold 212 (e.g., glue) is disposed about a portion of the conductor interface 202b located inside the second portion 210b of the outer shell, thereby providing protection to components of the conductor interface 202b during the manufacturing process. In some implementations, the outer shell 210 comprises metal (e.g., zinc alloy) or any other material having conductive properties.

The cable assembly 100 includes an inner shell 220 disposed about the conductor interface 202b and a portion of the cable 104. The inner shell 220 includes a connector end 220a encasing the second portion 210b of the outer shell, and a cable end 220b encasing a portion of the cable 104. The inner shell 220 is a structural support for the interface between the connector 102 and the cable 104, as it grips or is otherwise physically coupled to both (i) the outer shell 210 housing the connector head 202, and (ii) the cable 104. In some implementations, the inner shell 220 comprises steel (e.g., carbon steel such as SPCC steel) or any other material having a tensile strength that is high enough to withstand the force of the cable assembly 100 being unplugged from a receptacle while a user grips the cable 104.

The cable assembly 100 includes conductive resin 222 including a first portion 222a disposed inside the connector end 220a of the inner shell, and a second portion 222b disposed both inside and outside the cable end 220b of the inner shell. The physical relationship of the conductive resin 222 and the inner shell 220 is described in more detail below with reference to FIG. 4C. In some implementations, the conductive resin 222 comprises a synthetic resin with an electrically conductive filler, or any other material that can electrically couple multiple electrical contacts and/or create an electrical connection in materials that cannot be soldered (e.g., due to manufacturing constraints).

The cable assembly 100 includes an overmold 230 disposed about the connector components described above. Specifically, the overmold 230 encases the conductor interface 202b of the connector head, the second portion 210b of the outer shell, the connector end 220a and the cable end 220b of the inner shell, and the first portion 222a and the second portion 222b of the conductive resin. In some implementations, the overmold 230 comprises a thermoplastic elastomer (TPE), or any other material with thermoplastic and/or elastomeric properties.

FIGS. 3A-3C depict an example inner shell 220 of the connector 102 in accordance with some implementations. FIG. 3A is a perspective view 320 of the inner shell 220, FIG. 3B is a top view 340 thereof, and FIG. 3C is a side view 360 thereof. The top view 340 also represents the bottom view of the inner shell 220, and the side view 360 represents both left and right side views of the inner shell 220. Features shared between figures are similarly numbered.

Figure 4A:
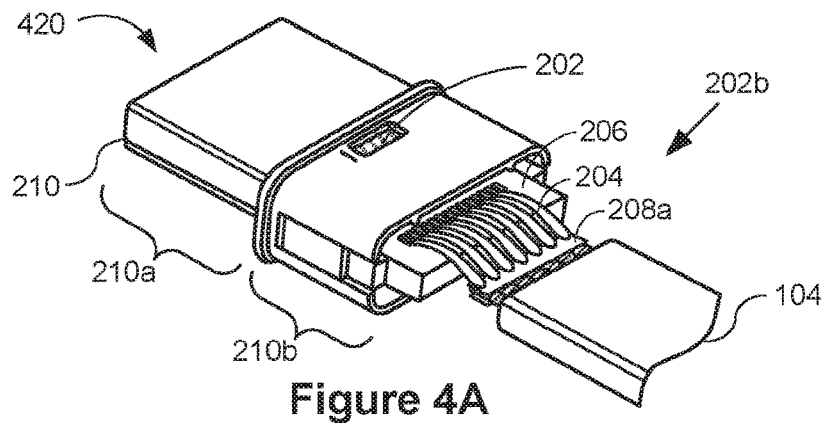
FIGS. 4A-4D depict perspective views of the cable assembly of FIG. 1 in successive manufacturing states in accordance with some implementations.
Figure 4B:
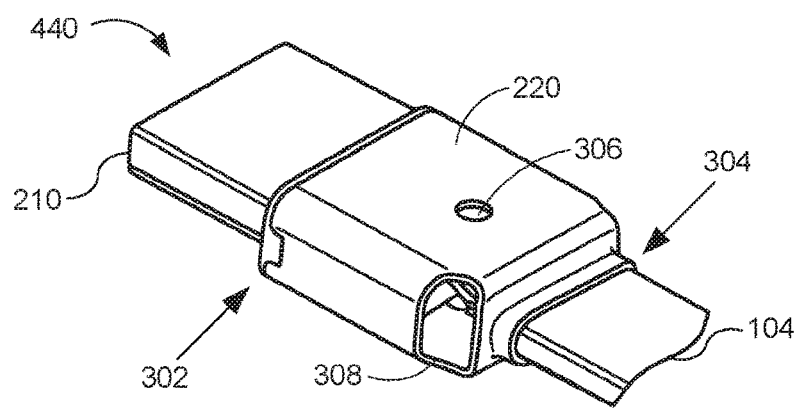

A first end (connector end 220a) of the inner shell 220, facing a direction of the connector head 202, includes a connector opening 302 in which the second portion 210b of the outer shell is disposed (see FIGS. 2 and 4B). A second end (cable end 220b), opposite of the first end and facing a direction of the cable 104, includes a cable opening 304 in which a portion of the cable 104 is disposed (see FIGS. 2 and 4B). Between the first and second ends are top/bottom surfaces 310 and side surfaces 312 (also referred to as lateral ends). While the figures depict the intersections of the various surfaces and ends of the inner shell 220 as being tapered or otherwise rounded, these intersections may be less rounded or not rounded at all, as long as the connector opening 302 is substantially complementary to the shape of the second portion 210b of the outer shell, and the cable opening 304 is substantially complementary to the shape of the cable 104.

The inner shell 220 includes an injection monitoring region 306 (also referred to as a vent) disposed on the top and/or bottom surface 310, exposing a portion of the first portion 222a of the conductive resin (see FIGS. 4B-4C, described in more detail below). The inner shell 220 includes two injection gates 308-1 and 308-2 (also referred to as injection openings or an injection access regions) disposed at the cable end 220b, through which the conductive resin 222 is injected during the manufacturing process. As a result of the manufacturing process, portions of the second portion 222b of the conductive resin that are disposed inside the inner shell 220 and portions of the second portion 222b of the conductive resin that are disposed outside the inner shell 220 are connected through the injection gate(s) 308 (see FIGS. 4B-4C, described in more detail below). Although FIGS. 3A-3C depict one injection monitoring region 306-1 disposed on the top surface 310 and one injection monitoring region 306-2 disposed on the bottom surface, the top surface 310 may have more than one injection monitoring region 306, the bottom surface may have more than one injection monitoring region 306, and the side surfaces 312 may have one or more injection monitoring regions 306. Although FIGS. 3A-3C depict two injection gates 308-1 and 308-2, the inner shell 220 may have a single injection gate 308 or more than two injection gates 308.

Placement and size of the injection monitoring region(s) 306 may vary from that shown in the figures, as long as the injection monitoring region(s) 306 are placed and sized large enough for observations to be made regarding the amount of conductive resin 222 disposed in the inner shell 220 during the manufacturing process, and sized small enough to ensure that the top/bottom surfaces 310 have enough continuous surface area to prevent conductive resin 222 from leaking out of the region(s) during the manufacturing process. For example, in some implementations, the injection monitoring region(s) 306 comprise a total area that is less than 25% of the surface area of the top/bottom surfaces 310.

Placement and size of the injection gate(s) 308 may vary from that shown in the figures, as long as the injection gate(s) 308 are placed and sized large enough to facilitate injection of the conductive resin 222 into the inner shell 220 during the manufacturing process, and sized small enough to ensure structural integrity of the connector end 220a and the cable end 220b of the inner shell. For example, in some implementations, the inner shell 220 includes two injection gates 308 disposed at opposite lateral ends of the conductor interface 202b (on side surfaces 312 at the cable end 220b of the inner shell; see FIGS. 2 and 3A-3C).

FIGS. 4A-4D depict perspective views of the cable assembly 100 in successive manufacturing states 420, 440, 460, and 480, respectively, in accordance with some implementations. Features shared between figures are similarly numbered, and some are not further discussed for purposes of brevity.

FIG. 4A depicts the cable assembly 100 after a plurality of conductors 204 disposed in a cable 104 have been coupled to a conductor interface 202b via a PCB assembly 206 of a connector head 202, a ground bar 208a has been coupled to shielding of the plurality of conductors 204, and the connector head 202 has been encased in an outer shell 210. In some implementations, an inner mold 212 (not shown) is applied inside the second portion 210b of the outer shell prior to installing the inner shell 220 and injecting the conductive resin 222.

FIG. 4B depicts the cable assembly 100 after an inner shell 220 has been placed over the second portion 210b of the outer shell (via the connector opening 302) and placed over a portion of the cable 104 (via the cable opening 304). Injection monitoring region(s) 306 are disposed above/below the conductor interface 202b (see FIG. 4A), providing observation point(s) for an injection process (described in more detail below). Injection gate(s) 308 are disposed in proximity to the cable opening 304. In FIG. 4B, conductive resin 222 has not yet been injected; as such, the injection monitoring region(s) 306 and the injection gate(s) 308 are in a pre-injection state (still visible and not yet filled with conductive resin 222).

Figure 4C:
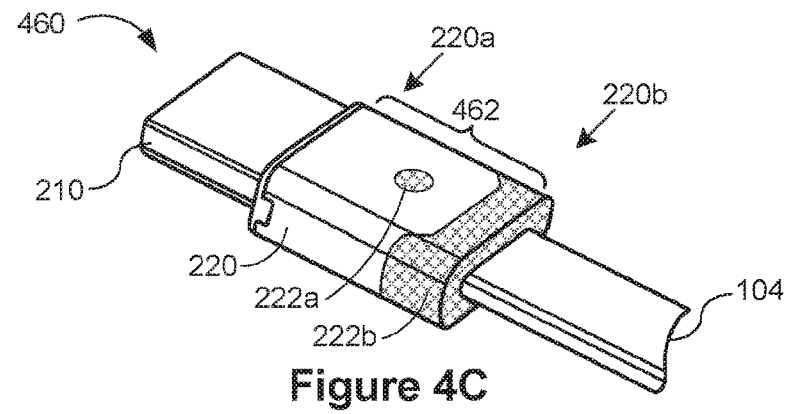

FIG. 4C depicts the cable assembly 100 after conductive resin 222 (see FIG. 2) has been injected into the inner shell 220. In an example injection process, an injection mold (not shown in FIGS. 4A-4D) is placed over the cable end of the inner shell 220 leaving the injection monitoring region(s) 306 exposed, and conductive resin 222 is injected into the inner shell 220 via the injection gate(s) 308. The injection process ceases when a first portion 222a of the conductive resin is disposed or otherwise viewable in the injection monitoring region(s) 306, and a second portion 222b of the conductive resin is disposed inside and outside the cable end 220b of the inner shell. To be clear, the second portion 222b of the conductive resin includes (i) a portion disposed inside the inner shell 220 due to the injection process having caused conductive resin to be injected into the inner shell 220 through the injection gate(s) 308, and (ii) a portion disposed outside the inner shell 220 due to the injection process having caused conductive resin to be injected into a space between the inner shell 220 and the injection mold at the cable end 220b of the inner shell 220. In FIG. 4C, since the conductive resin 222 has been injected, the injection monitoring region(s) 306 and the injection gate(s) 308 are in a post-injection state (filled with portions of conductive resin 222a and 222b, respectively).

In some implementations, upon ceasing the injection process, the connector end 220a of the inner shell and the second portion 222b of the conductive resin form a contiguous surface 462 shaped by the inner shell and the injection mold. Further, in some implementations, upon ceasing the injection process, the connector end 220a of the inner shell and an exposed portion of the first portion 222a of conductive resin form a contiguous surface, which is contiguous with the contiguous surface 462. As a result of the injection process having injected conductive resin outside of the cable end 220b of the inner shell, the second portion 222b of the conductive resin is in contact with (i) the cable end 220b of the inner shell, and (ii) the cable 104, thereby providing structural support at the interface between the connector 102 and the cable 104.

Figure 4D:
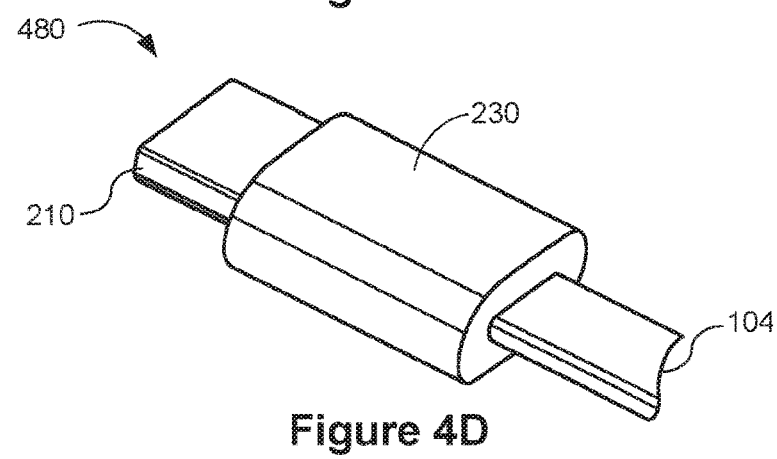

FIG. 4D depicts the cable assembly 100 after encasing the conductor interface 202b of the connector head, the second portion 210b of the outer shell, the connector end 220a and cable end 220b of the inner shell, and the first portion 222a and second portion 222b of the conductive resin with an overmold 230 (see also FIG. 2). In some implementations, the overmold 230 is installed using a second injection process.

Manufacturing Process

Figure 5:
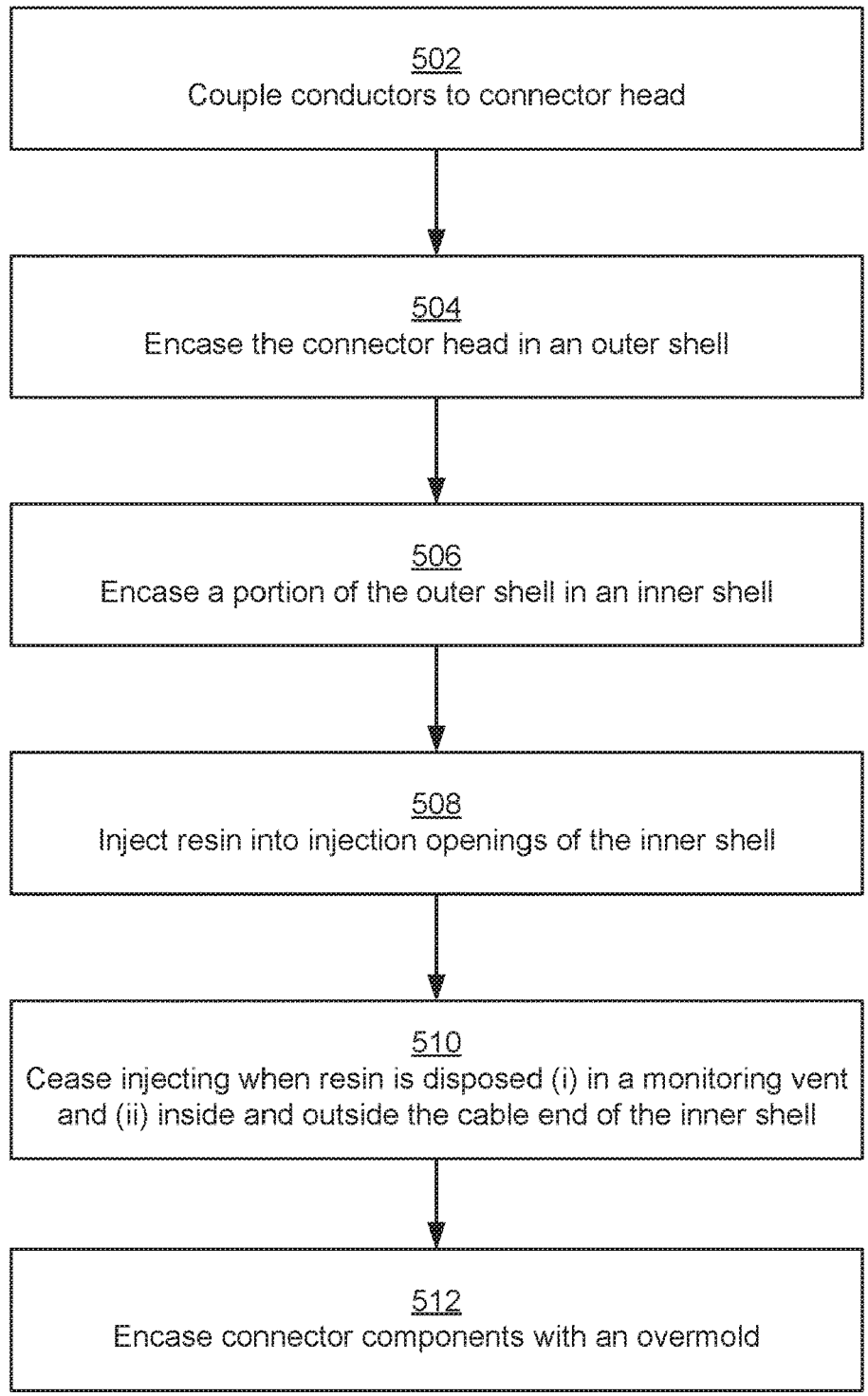
FIG. 5 depicts an example manufacturing process of a cable assembly in accordance with some implementations.

FIG. 5 depicts an example manufacturing process 500 of a cable assembly in accordance with some implementations. The process 500 includes coupling (502) a plurality of conductors 204 disposed in a cable 104 to a conductor interface 202b of a connector head 202.

The process 500 further includes encasing (504) the connector head 202 in an outer shell 210, the outer shell including a first portion 210a encasing the plug 202a of the connector head and a second portion 210b encasing the conductor interface 202b of the connector head.

The process 500 further includes encasing (506) the second portion 210b of the outer shell in an inner shell 220, the inner shell including (i) a connector end 220a encasing the second portion 210b of the outer shell, (ii) a cable end 220b encasing a portion of the cable 104 and including injection gate(s) 308, and (iii) injection monitoring region(s) 306 disposed between the connector end 220a of the inner shell and the cable end 220b of the inner shell.

The process 500 further includes injecting (508) conductive resin 222 into the injection gate(s) 308 of the cable end 220b of the inner shell and ceasing injection (510) of the conductive resin when (i) a first portion 222a of the conductive resin is disposed in the injection monitoring region(s) 306 of the inner shell 220 and (ii) a second portion 222b of the conductive resin is disposed inside and outside the cable end 220b of the inner shell.

The process 500 further includes encasing (512) the conductor interface 202b of the connector head, the second portion 210b of the outer shell, the connector end 220a and the cable end 220b of the inner shell, and the first portion 222a and the second portion 222b of the conductive resin with an overmold 230.

In some implementations, the process 500 further includes coupling ground bar(s) 208a, 208b to shielding of the plurality of conductors 204 and/or to the cable end 220b of the inner shell. In some implementations, the process 500 further includes applying an inner mold 212 inside the second portion 210b of the outer shell prior to injecting the conductive resin into the injection gate(s) 308. In some implementations, the process 500 further includes, prior to injecting the conductive resin into the injection gate(s) 308, placing an injection mold over the cable end 220b of the inner shell leaving the injection monitoring region(s) 306 exposed, and after injecting the conductive resin 222 into the injection gate(s) 308, removing the injection mold.

Conclusion

The conductive resin 222, when disposed in a cable assembly 100 as described above with references to FIGS. 2-5E, has electrical advantages (e.g., shielding against desense-causing noise) and mechanical advantages (e.g., strengthening the interface between the inner shell 220 and the cable 104). The electrical advantages are obtained by applying the conductive resin 222 over electrical contacts inside the inner shell 220, thereby shielding wireless communication components from desense-causing noise. The mechanical advantages are obtained by applying the conductive resin 222 over the area where the cable end 220b of the inner shell meets the cable 104, thereby reinforcing the strength and durability of the interface 103 between the connector 102 components (e.g., shells) and the cable 104 components (e.g., conductors).

Further, the shielding features provided by the electrical properties of the conductive resin and the reinforcing features provided by the mechanical properties of the conductive resin are employed using a single injection process (operation 508, FIG. 5), and a single material (conductive resin 222, FIG. 2), which may increase efficiency of the manufacturing process, decrease manufacturing cost and time, and increase durability and performance of the cable assembly.

Miscellaneous

The foregoing description has been described with reference to specific implementations. However, the illustrative discussions above are not intended to be exhaustive or to limit the claims to the precise forms disclosed. Many variations are possible in view of the above teachings. The implementations were chosen and described in order to best explain principles of operation and practical applications, to thereby enable others skilled in the art.

The various drawings illustrate a number of elements in a particular order. However, elements that are not order dependent may be reordered and other elements may be combined or separated. While some reordering or other groupings are specifically mentioned, others will be obvious to those of ordinary skill in the art, so the ordering and groupings presented herein are not an exhaustive list of alternatives.

As used herein: the singular forms "a", "an," and "the" include the plural forms as well, unless the context clearly indicates otherwise; the term "and/or" encompasses all possible combinations of one or more of the associated listed items; the terms "first," "second," etc. are only used to distinguish one element from another and do not limit the elements themselves; the term "if" may be construed to mean "when," "upon," "in response to," or "in accordance with," depending on the context; and the terms "include," "including," "comprise," and "comprising" specify particular features or operations but do not preclude additional features or operations.

What is claimed is:

1. A cable assembly, comprising:
   a connector head electrically coupled to a plurality of conductors disposed in a cable, the connector head having a plug and a conductor interface;
   an outer shell including:
   a first portion encasing the plug of the connector head, and
   a second portion encasing the conductor interface of the connector head;
   an inner shell including:
   a connector end encasing the second portion of the outer shell, and
   a cable end encasing a portion of the cable and including an injection gate;
   and conductive resin including:
   a first portion disposed inside the connector end of the inner shell, and
   a second portion disposed inside and outside the cable end of the inner shell;
   wherein inside and outside portions of the second portion of the conductive resin are connected through the injection gate; and
   wherein the connector end of the inner shell and the second portion of the conductive resin form a contiguous surface.

2. The cable assembly of claim 1, further comprising:
   an overmold encasing the conductor interface of the connector head, the second portion of the outer shell, the connector end and the cable end of the inner shell, and the first portion and the second portion of the conductive resin.

3. The cable assembly of claim 1, further comprising:
   a ground bar electrically coupled to shielding of the plurality of conductors and the cable end of the inner shell.

4. The cable assembly of claim 1, further comprising:
   an inner mold disposed inside the second portion of the outer shell.

5. The cable assembly of claim 1, wherein:
   the inner shell further includes an injection monitoring region exposing a portion of the first portion of the conductive resin; and
   the connector end of the inner shell and the exposed portion of the first portion of the conductive resin form a contiguous surface.

6. The cable assembly of claim 1, wherein:
   the inner shell further includes an injection monitoring region exposing a portion of the first portion of the conductive resin;
   a surface of the inner shell in which the injection monitoring region is disposed comprises a first surface area; and
   the injection monitoring region comprises a total area that is less than 25% of the first surface area.

7. The cable assembly of claim 1, wherein the cable end of the inner shell includes two injection gates disposed at opposite lateral ends of the conductor interface.

8. The cable assembly of claim 1, wherein the second portion of the conductive resin is in contact with the cable end of the inner shell and the cable.

9. The cable assembly of claim 1, wherein the plug of the connector head is a high definition multimedia interface (HDMI) connector.

10. The cable assembly of claim 1, wherein the inner shell comprises carbon steel.

11. A method of manufacturing a cable assembly, comprising:
   coupling a plurality of conductors disposed in a cable to a conductor interface of a connector head;
   encasing a plug of the connector head in an outer shell, the outer shell including a first portion encasing the plug of the connector head and a second portion encasing the conductor interface of the connector head;
   encasing the second portion of the outer shell in an inner shell, the inner shell including a connector end encasing the second portion of the outer shell, a cable end encasing a portion of the cable and including an injection gate, and an injection monitoring region disposed between the connector end of the inner shell and the cable end of the inner shell;
   injecting conductive resin into the injection gate of the cable end of the inner shell; and
   ceasing the injecting of the conductive resin when a first portion of the conductive resin is disposed in the injection monitoring region of the inner shell and a second portion of the conductive resin is disposed inside and outside the cable end of the inner shell.

12. The method of claim 11, further comprising:
encasing the conductor interface of the connector head, the second portion of the outer shell, the connector end and the cable end of the inner shell, and the first portion and the second portion of the conductive resin with an overmold.

13. The method of claim 11, further comprising:
coupling a ground bar to shielding of the plurality of conductors and the cable end of the inner shell.

14. The method of claim 11, further comprising:
applying an inner mold inside the second portion of the outer shell prior to injecting the conductive resin into the injection gate.

15. The method of claim 11, further comprising:
prior to injecting the conductive resin into the injection gate, placing an injection mold over the cable end of the inner shell leaving the injection monitoring region exposed; and
after injecting the conductive resin into the injection gate, removing the injection mold;
wherein the connector end of the inner shell and the second portion of the conductive resin form a contiguous surface shaped by the injection mold.

* * * * *